United States Patent
Blevins

(10) Patent No.: US 6,418,463 B1
(45) Date of Patent: Jul. 9, 2002

(54) METHOD AND APPARATUS FOR NEGOTIATING CONTRACT TERMS FOR EXECUTION OF A MOBILE SOFTWARE AGENT ON A HOST COMPUTER

(75) Inventor: Terence J. Blevins, Springboro, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/215,628

(22) Filed: Dec. 17, 1998

(51) Int. Cl.⁷ .............................................. G06F 15/16
(52) U.S. Cl. ...................... 709/202; 709/205; 709/223; 709/224
(58) Field of Search ................. 709/200–206, 709/217, 223–224, 317

(56) References Cited

U.S. PATENT DOCUMENTS

| | | | | |
|---|---|---|---|---|
| 5,825,759 A | * | 10/1998 | Liu ............................ | 370/331 |
| 6,009,456 A | * | 12/1999 | Frew et al. .................. | 709/202 |
| 6,047,311 A | * | 4/2000 | Ueno et al. .................. | 709/202 |
| 6,065,039 A | * | 5/2000 | Paciorek ..................... | 709/202 |
| 6,148,327 A | * | 11/2000 | Whitebread et al. ......... | 709/202 |
| 6,157,941 A | * | 12/2000 | Verkler et al. .............. | 709/202 |
| 6,175,855 B1 | * | 1/2001 | Reich et al. ................ | 709/202 |
| 6,233,601 B1 | * | 5/2001 | Walsh ........................ | 709/202 |
| 6,279,034 B1 | * | 8/2001 | Jarriel et al. ................ | 709/223 |
| 6,308,208 B1 | * | 10/2001 | Jung et al. .................. | 709/202 |
| 6,336,139 B1 | * | 1/2002 | Feridun et al. ............. | 709/202 |

* cited by examiner

*Primary Examiner*—Bharat Barot
(74) *Attorney, Agent, or Firm*—Steven J. Adamson

(57) ABSTRACT

A contract-based mobile software agent (MSA) arrangement for use between a user and host computer to permit a defined, secure and accountable access of the host computer by a user. The agent message (AM) propagated by the host (or alternatively provided on the host itself) preferably includes terms related to the remote host access. The AM also preferably includes enhanced AM code that provides sufficient intelligence for the AM to negotiate terms with complementary software at the host machine.

13 Claims, 4 Drawing Sheets

METHOD AND APPARATUS FOR NEGOTIATING CONTRACT TERMS FOR EXECUTION OF A MOBILE SOFTWARE AGENT ON A HOST COMPUTER

FIELD OF THE INVENTION

The present invention relates to data transfer between two or more computer systems and, more specifically, to constructively managing the extraction of data from a host machine and the use of a host machine resources by a requesting machine.

BACKGROUND OF THE INVENTION

There has been significant growth in the Internet and new URLs or websites are coming on-line each day. At present, a person accessing the Internet typically transmits a simple request to a particular website or "host" computer. In response, the host computer returns the requested information. The returned information may be text and/or image data for a selected website page or the result of a boolean string database query or the like.

Requests from a user to a host machine can also be performed by a mobile software agent (MSA). A MSA is a computer program associated with a user that independently performs a request at a remote host computer on behalf of the user. MSAs typically contain a component that is transmitted to the host machine and that runs on the host machine as an application. The MSA may perform many tasks including accessing application software in the host, processing information on behalf of a user, completing a purchase, i.e., electronic commerce, and any other task that the agent is programmed to perform.

While current MSA and Internet technologies provide a beneficial increase in the transmission and dissemination of information, there are also disadvantageous aspects.

Currently, there are few or no limitations on the demands that a MSA can make on a host. If a first MSA processes a request that is overly consumptive of host resources, then a second MSA and a third MSA, etc., are prevented or undesirably delayed from accessing the host. This problem is exacerbated by the fact that the number of users is continually increasing, thus increasing the likelihood of delayed or dropped responses.

In addition, MSAs are currently being developed that operate in different architectures. The utilization on a particular architecture of a MSA type that was designed for a different architecture may result in communication problems. A need thus exists to develop a manner of processing MSAs that permit more uniform operation on different architectures. Furthermore, there is also a need that MSAs be de-sensitized to (or function substantially independent of) such parameters as transport media, communication protocol, server type and "agent language," etc., to accommodate the various types of MSAs that are likely to emerge and the environments in which they run.

SUMMARY OF THE INVENTION

Accordingly, it is an object of the present invention to provide a MSA arrangement that provides for efficient, managed and secure access to a remote host by a user.

It is another object of the present invention to provide host access management in an Internet environment or the like.

It is also an object of the present invention to provide a MSA arrangement that implements a negotiated contract-like agreement between a user and host that defines access to the host by the user.

These and related objects of the present invention are achieved by use of an apparatus and method for mobile software agent with definable terms as described herein.

The attainment of the foregoing and related advantages and features of the invention should be more readily apparent to those skilled in the art, after review of the following more detailed description of the invention taken together with the drawings.

DETAILED DESCRIPTION

Figure 1:
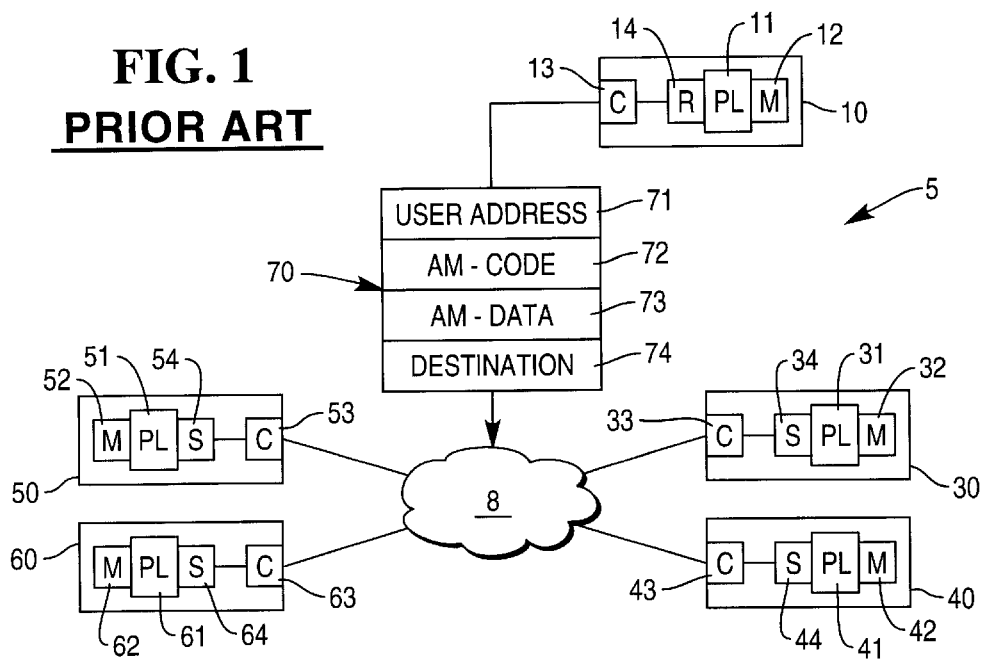
FIG. 1 is a diagram of a prior art computer network 5 that implements a mobile software agent (MSA) access of a host computer in accordance with the present invention.

Referring to FIG. 1, a diagram of a prior art computer network 5 that implements a mobile software agent (MSA) access of a host computer is shown. A user computer 10 and a plurality of host computers 30,40,50,60 are shown coupled to the remainder of the network, generally indicated with reference numeral 8. This network could be the Internet or an intranet or a combination thereof, etc.

Each computer includes processing logic 11,31,41,51,61, associated memory 12,32,42,52,62 and a network communication device 13,33,43,53,63, such as a modem or Ethernet adapter card or the like. Each host computer also includes logic 34,44,54,64 for servicing requests from a user and each user includes logic 14 for formulating a request.

In the context of Internet communications, for example, a user may desire to "visit" a web-site that is resident on host computer 30 (or another). The user specifies the URL of the desired site, i.e., www.xyz.net, and request formulation logic 12 converts the URL request into an agent message (AM) 70 that includes a plurality of components. These components include user address 71, agent message code or software program 72, AM data 73 and destination address 74.

Request service logic 34 in host computer 30 separates these components and processes the AM code and data. The AM code and data may initially only request transmission of a web page. Subsequent requests, however, may include a database query or another type of request that is serviced by the AM code executing on the host's CPU. Various request types and servicing techniques are known in the art.

As alluded to in the Background of the Invention section, increased network traffic and burdensome demands on a host computer's resources can lead to bottlenecks at the host computer (and simple over use of the host computer, etc.) that significantly reduce performance.

Figure 2:
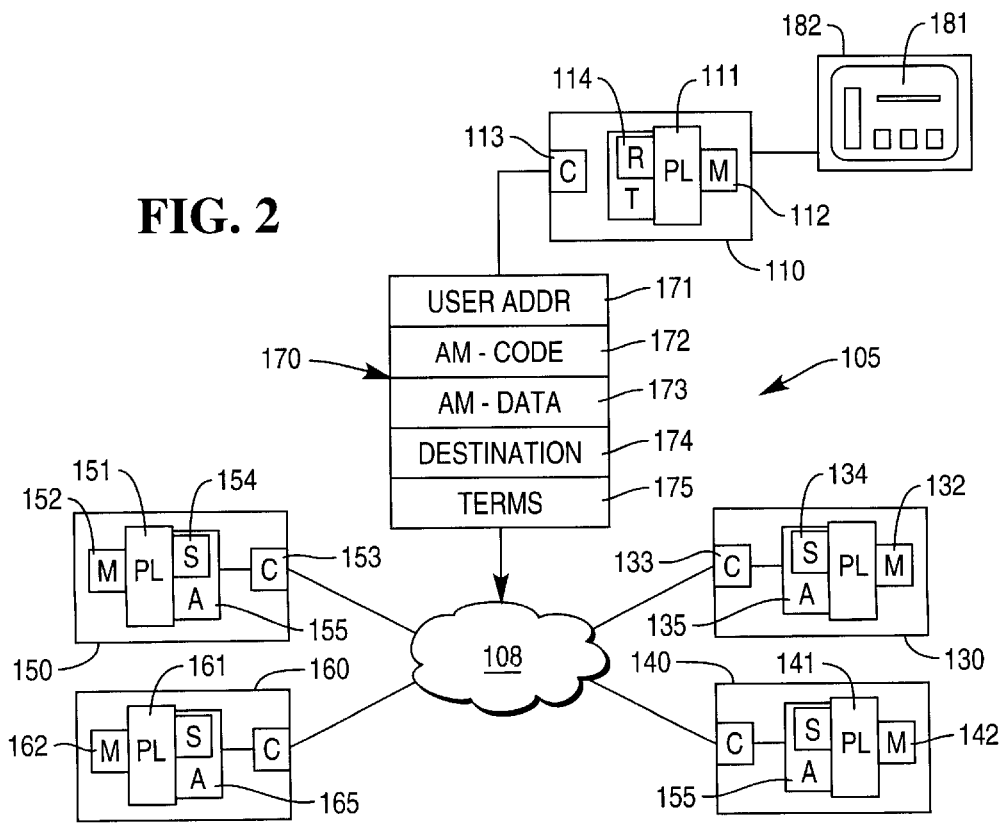
FIG. 2 is a diagram of a computer network including a contract based MSA in accordance with the present invention.

Referring to FIG. 2, a diagram of a computer network including a contract based MSA in accordance with the present invention is shown. The network 105 of FIG. 2 is similar to the network 5 of FIG. 1. Similar components have the same tens and units value, e.g., host computer 130 is analogous to host computer 30, etc. It should be recognized that the communication devices 133,143,153,163 in FIG. 2 can include wireless devices.

The network of FIG. 2 also provides for the propagation of AMs that can access a host computer in such a manner that bottlenecks and over use situations are significantly reduced or eliminated. This is achieved by providing within AM 170 a "contract terms" component that specifies parameters related to a user's desired access of a host computer. The MSA (through enhanced AM code 172) and the host computer are preferably programmed to negotiate the terms by which the user will access the host. Initial term offering and negotiation on behalf of the user are preferably carried out by the enhanced AM code executing at the host. Offer review and negotiation functions on behalf of the host are preferably carried out by complementary acceptance logic within the host. Exemplary content for the negotiable terms is provided below.

Figure 3:
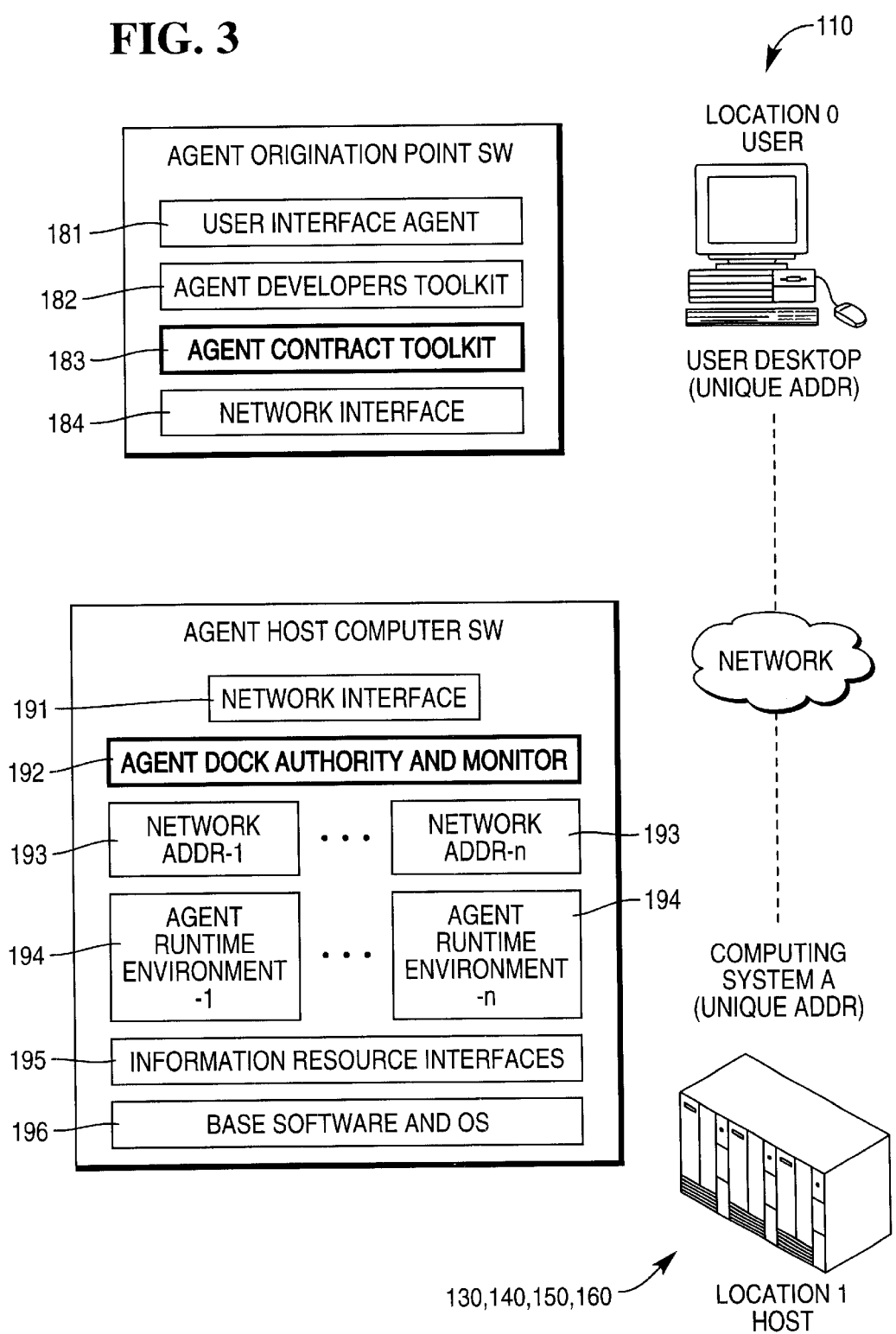
FIG. 3 is a diagram that illustrates programs on the user and host computers that perform contract formation and fulfillment in accordance with the present invention.

Referring to FIG. 3, a diagram that illustrates programs that are preferably provided on the user and host computers to perform contract formation and fulfillment in accordance with the present invention is shown. These programs are preferably executed by known processors. The term "logic" is generally used herein to refer to this combination of software and hardware, and is also intended to cover similar functions that are carried out in firmware or hardware.

Known logic within user computer 110 provides user interface agent 181, agent development toolkit 182 and a network interface 184. Info Sleuth is an example of a commercial software product that includes these features. Logic in accordance with the present invention (and discussed in more detail below) provides agent contract toolkit 184.

Known logic within host computer 130 (and host computers 140,150,160) provides a network interface 191, a plurality of network addresses for agent run-time environments 193, a plurality of corresponding application run-time environments 194, information resource interfaces 195 and base software and operation system components 196. The network interface 191, agent run-time environment addresses 193, agent run-time environments 194, information resource interfaces 195 and base software and OS components 196 are known in the art. An agent dock authority and monitor (ADAM) program 192 is preferably provided in host computer 130 (or the like) in accordance with the present invention.

Network interfaces 184,191 refer to software that talks to network socket addresses and the like. Examples include TCPIP and related programs. Information resource interfaces 195 include interfaces to relational databases and other memory or other resources, etc. The base software and OS components 196 include standard OS calls and utilities that an application may request, etc.

Contract Defining and MSA Processing

The agent contract toolkit is a program that permits a user to create the contract terms or "offer" that is appended to the agent message. In a preferred embodiment, the toolkit prompts a user through a graphics user interface (GUI) to specify the terms (discussed in more detail below) of a remote access. FIG. 2 illustrates a monitor 182 with a GUI 181 displayed thereon. GUI technology is known in the art. The agent contract toolkit is preferably configured such that default terms can be selected or a user can specify a custom package of terms. The selected terms can be saved and automatically appended to each MSA message or selected and appended each time a new remote access is generated.

The ADAM program 192 is a program that has access to resource status registers (and in some potential instances, instruction queues) and to standard probes and sensors that detect resource availability. The ADAM program preferably uses standard system management techniques. The ADAM program also provides control of MSA traffic, and is capable of rejecting or accepting a contract offer. ADAM functions are provided by acceptance logic 135 (and 145,155,165).

The ADAM program and enhanced AM code primarily operate in a plurality of phases and these include Negotiation, Docking, Agent Processing and Exit and Payment. The ADAM program may be configured to process MSAs sequentially or concurrently. These four phases are now described in more detail and are illustrated diagrammatically in FIG. 4.

Negotiation

In the negotiation phase, ADAM investigates AMs and determines if AMs can be processed within the terms specified in the terms component. The agent itself preferably "manipulates" the terms (if they are rejected) using its intelligence, since the terms are preferably established within tolerances. ADAM preferably investigates considerations such as host ability to fulfill the agent request, resource availability, acceptable payment mechanisms, etc. The MSA is preferably configured to renegotiate or re-present terms to ADAM when previous terms are rejected or have expired.

Docking

The dock process includes setting up the access paths to the necessary resources, setting up security privileges, allocating processing time, and passing the agent to the appropriate agent execution environment.

Agent Processing

The agent processing phase includes the monitored execution of the agent. Monitoring checks are made based upon the terms and type of access specified in the agent contract, e.g., resource utilization, data base accesses, time passed, etc. If an MSA has not completed a request when a threshold condition is detected, then a renegotiation step is preferably executed to determine if the agent wishes to proceed.

Exit and Payment

The exit phase includes freeing any resource tied up by the agent and ensuring that the payment mechanism is invoked. Resource clean up, i.e., resetting registers, etc., and agent return steps are also preferably performed during this phase.

Figure 4:
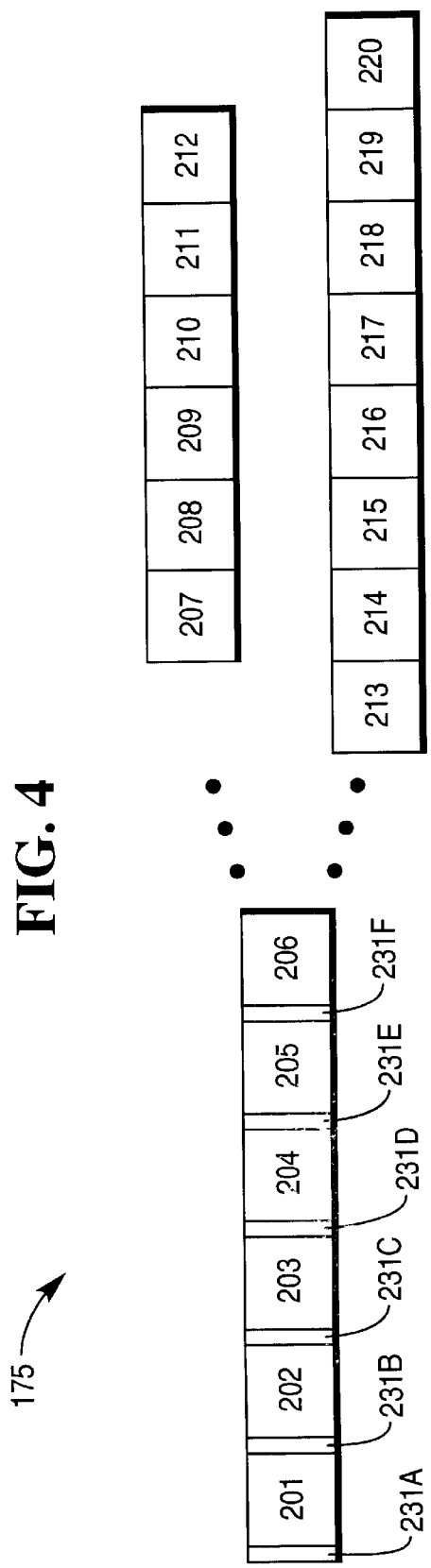
FIG. 4 is a representative terms component in accordance with the present invention.

Referring to FIG. 4, an exemplary terms component is shown. The terms values are preferably generated via GUI 181 (FIG. 2). The terms component 175 may include a plurality of fields 201–220. The field may be distinguished by a predefined size and order or may be preceded by an identifying headers 231A–231F (only six of which are shown). Field 201 may indicate a request type, e.g., database query (perhaps even specifying a particular type of database or query). Field 202 may specify the type of payment, i.e., credit-visa, etc, while fields 203–205 may specify an account number, expiration date and card holder's name, respectively.

Price and time-of-use terms may be established in at least two manners. In a first manner (implemented with fields 207–212), the initial price term is provided in field 207. Fields 208 and 209 respectively contain the amount by which to increment the previously offered price and the upper limit of the price term. The AM code and ADAM program can negotiate, for example, to determine a cost per unit time. As similar field arrangement is provided to establish the time-of-use terms. Field 210 indicates an initial request time, field 211 specifies the amount by which to increment/decrement the time with each subsequent offer and field 212 specifies a threshold time period.

In an alternative manner, the time and price fields are arranged such that a plurality of time fields 213,217 are provided and each has a negotiable price associated therewith. For example, field 213 specifies a fast response time and fields 214–216 specify initial price, increment value and threshold price for the first response time, respectively. Field 217 specifies a slower response time and fields 218–220 provide similar price negotiation terms for the slower response time, etc. Fields for even slower response times, for example, could be provided subsequent to fields 218–220.

Figure 5:
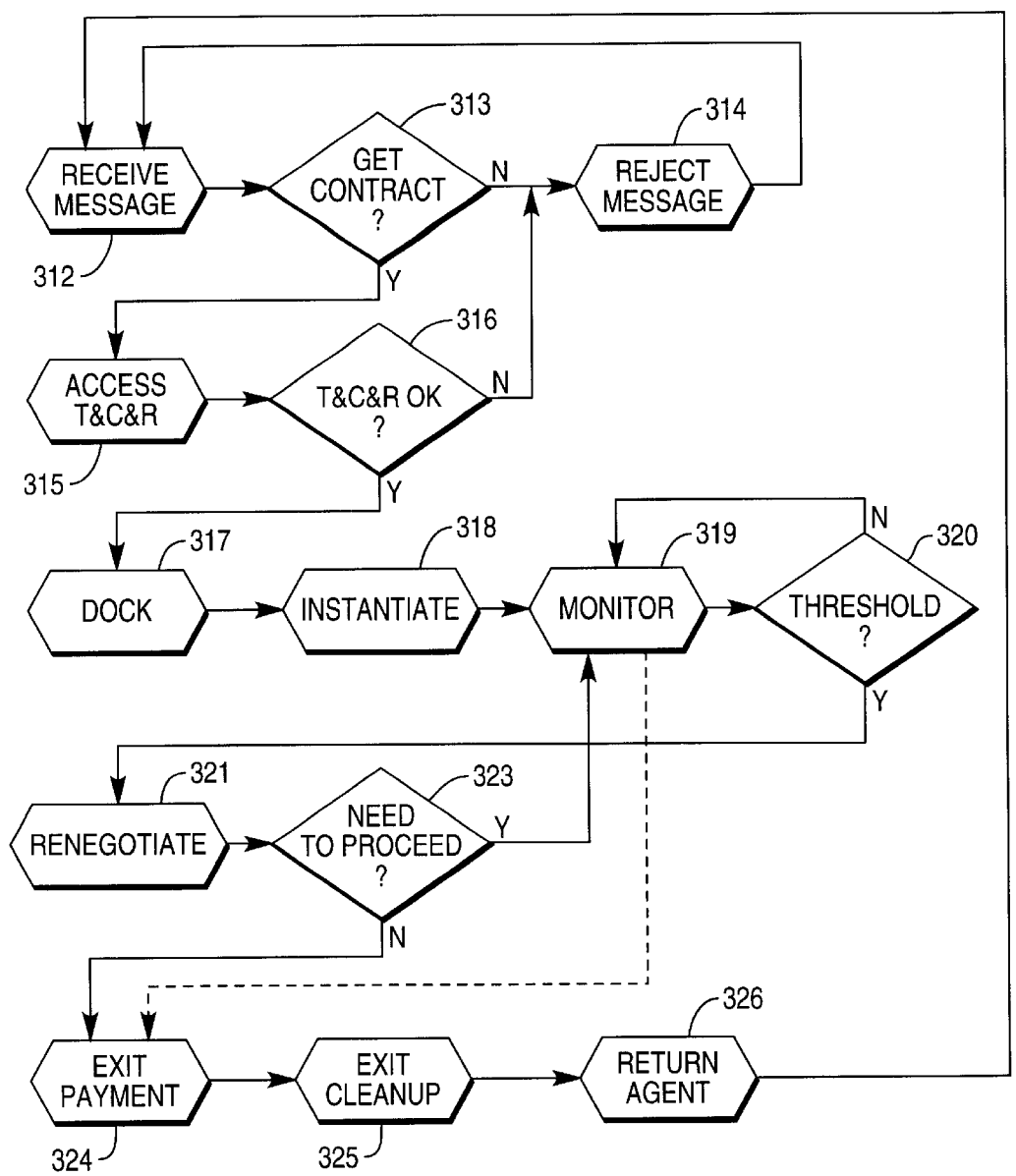
FIG. 5 is a flowchart that illustrates contract term negotiation and AM processing in accordance with the present invention.

Referring to FIG. 5, a flowchart that illustrates contract term negotiation and AM processing in accordance with the present invention. In step 312, the agent message 120 is received. In step 313, a determination is made as to whether contract terms 175 are appended. If no contract terms are appended, then the agent message is rejected (step 314). If contract terms are appended, then these terms are accessed (step 315) and a determination is made as to whether they are acceptable (step 316). The determination of step 316 is in part based on the monitored status of the host computer as discussed above and the general acceptability of the terms. If the terms are not acceptable, then the agent message is rejected. If the terms are acceptable, then the MSA is permitted to dock (step 317).

In step 318, the MSA is allowed access to specified host computer resources and in step 319, contract monitoring commences. If the agent message completes its request before a time, price or other threshold is met, then processing flows to exit step 324. In step 320, a determination is made as to whether agreed upon thresholds have been met. If they have, then in step 321, the renegotiation of threshold term(s) is performed. In step 223, a determination is preferably made as to whether the MSA requires further processing. If it does then flow returns to monitoring step 319. If it does not, then flow proceeds to exit step 324.

In step 324, payment transactions are completed and in step 325 host computer clean up steps are taken. In step 326, the MSA is released and returned to the user.

It should be recognized that although the term variations are provided by the AM in the preferred embodiment they may alternatively be provided in whole or put in the host computer (i.e., the AM picks from amongst them) without departing from the present invention.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A computing apparatus, comprising:
   a user computer for generating a mobile software agent (MSA), said MSA including a contract terms component, said contract terms component including contract terms parameters related to a user's desired access of a host computer; and
   a host computer coupled to receive said MSA from said user computer, said host computer including:
   logic that attempts to form an agreement with said MSA that defines contract terms related to the processing of said MSA, said contract terms being within the contract terms parameters included in said contract terms component; and
   mobile software agent (MSA) service logic that services said MSA in accordance with a formed agreement, if one is formed; and
   wherein said contract terms include one or more term from the group of terms including:
   time of use;
   cost of use;
   ability to fulfill MSA request;
   resources to be made available; and
   payment method.

2. The apparatus of claim 1, wherein said agreement forming logic includes logic that determines whether proposed terms for processing said MSA are acceptable.

3. The apparatus of claim 1, wherein said agreement forming logic includes negotiation logic that negotiates with said received MSA to determine mutually agreeable terms for the processing of said MSA.

4. The apparatus of claim 3, wherein said negotiation logic rejects unacceptable terms and permits said MSA to offer a substitute term for an unacceptable term.

5. The apparatus of claim 1, further comprising monitoring logic that monitors performance of said MSA and determines if a threshold for one or more of the accepted terms has been met.

6. The apparatus of claim 5, further comprising renegotiation logic that permits a renegotiation of MSA processing terms after said threshold has been met.

7. The apparatus of claim 1, further comprising docking logic that permits said MSA for which said agreement forming logic has formed an agreement to have access to secure resources of said computing apparatus for servicing said MSA.

8. The apparatus of claim 1, wherein said MSA is configured so as to be able to negotiate processing terms with said host computer.

9. The apparatus of claim 1, wherein said MSA contract terms component includes at least one processing term and said user computer includes term defining logic that permits a user to define said at least one processing term.

10. The apparatus of claim 1, wherein said MSA contract terms component contains at least one term and a plurality of values for that one term.

11. A method of processing a mobile software agent (MSA), comprising the steps of:

including within said MSA a contract terms component, said contract terms component including contract terms parameters related to a user's desired access of a host computer;

receiving said MSA at said host computer;

automatically attempting at said host computer to form an agreement with said MSA that defines contract terms related to the processing of said MSA, said contract terms being within the contract terms parameters included in said contract terms component; and processing said MSA at a host computer in accordance with a formed agreement, if one is formed; and wherein said contract terms include one or more term from the group of terms including:

time of use;

cost of use;

ability to fulfill MSA request;

resources to be made available; and payment method.

12. The method of claim 11, further comprising the step of negotiating at said host computer at least one contract term with said MSA to form said agreement.

13. The method of claim 11, further comprising the step of:

monitoring processing of said MSA for which a processing agreement has been formed to determine if a threshold value of a contract term of said agreement has been reached.

* * * * *